(12) United States Patent
Bertram et al.

(10) Patent No.: US 9,984,087 B2
(45) Date of Patent: *May 29, 2018

(54) PERFORMING ACTIONS ON OBJECTS AS A RESULT OF APPLYING TAGS TO THE OBJECTS

(71) Applicant: International Business Machines Corporation, Armonk, NY (US)

(72) Inventors: Randal L. Bertram, Raleigh, NC (US); Gregory R. Hintermeister, Rochester, MN (US); Geraint North, Manchester (GB); Paul B. Tippett, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 867 days.

This patent is subject to a terminal disclaimer.

(21) Appl. No.: 14/497,794

(22) Filed: Sep. 26, 2014

(65) Prior Publication Data

US 2016/0042031 A1 Feb. 11, 2016

Related U.S. Application Data

(63) Continuation of application No. 14/451,569, filed on Aug. 5, 2014.

(51) Int. Cl.
 *G06F 17/30* (2006.01)
(52) U.S. Cl.
 CPC ................. *G06F 17/3012* (2013.01)
(58) Field of Classification Search
 CPC .................................. G06F 17/3012
 USPC .......................................................... 707/736
 See application file for complete search history.

(56) References Cited

U.S. PATENT DOCUMENTS

| | | |
|---|---|---|
| 5,987,480 A | 11/1999 | Donohue et al. |
| 7,457,853 B1 | 11/2008 | Chari et al. |
| 7,590,647 B2 | 9/2009 | Srinivasan et al. |
| 7,774,713 B2 | 8/2010 | Mital et al. |
| 7,827,110 B1 | 11/2010 | Wieder |
| 7,930,629 B2 | 4/2011 | Hurst-Hiller et al. |
| 8,250,048 B2 | 8/2012 | Yalamanchi et al. |
| 9,081,798 B1 | 7/2015 | Wong |
| 2001/0013024 A1 | 8/2001 | Takahashi et al. |
| 2002/0143816 A1 | 10/2002 | Geiger et al. |
| 2006/0112152 A1 | 5/2006 | Napier et al. |
| 2006/0155738 A1 | 7/2006 | Baldwin et al. |
| 2007/0177957 A1 | 8/2007 | Daggers et al. |

(Continued)

OTHER PUBLICATIONS

Chang et al., "A context aware handheld wayfinding system for individuals with cognitive impairments." Proceedings of the 10th international ACM SIGACCESS conference on Computers and accessibility. ACM, 2008.

(Continued)

*Primary Examiner* — Thanh-Ha Dang
(74) *Attorney, Agent, or Firm* — Patterson + Sheridan, LLP

(57) ABSTRACT

Methods to tag objects in a cloud computing environment, by tagging an object with a first tag, of a plurality of tags, wherein each of the plurality of tags specifies a respective criterion for objects tagged by each tag, and upon determining that the object not satisfy the criterion of the first tag, performing an action associated with the first tag to modify the object to meet the criterion of the first tag.

7 Claims, 8 Drawing Sheets

(56) References Cited

U.S. PATENT DOCUMENTS

| | | | |
|---|---|---|---|
| 2008/0021876 A1* | 1/2008 | Ahern | G06F 9/4436 |
| 2008/0133486 A1 | 6/2008 | Fitzgerald et al. | |
| 2008/0222513 A1 | 9/2008 | Van Den Berge | |
| 2009/0030982 A1* | 1/2009 | Spivack | G06F 17/30908 709/204 |
| 2009/0055742 A1 | 2/2009 | Nordhagen | |
| 2009/0113397 A1 | 4/2009 | Wright, Sr. | |
| 2009/0177957 A1 | 7/2009 | Bouillet et al. | |
| 2010/0082576 A1 | 4/2010 | Walker et al. | |
| 2010/0146015 A1 | 6/2010 | Milic-Frayling et al. | |
| 2011/0040757 A1* | 2/2011 | Kossi | G06F 17/3002 707/737 |
| 2011/0106835 A1 | 5/2011 | Lauridsen et al. | |
| 2011/0145258 A1 | 6/2011 | Kankainen | |
| 2011/0178973 A1 | 7/2011 | Lopez et al. | |
| 2011/0289077 A1 | 11/2011 | Wade et al. | |
| 2012/0078592 A1* | 3/2012 | Sims, Jr. | G06F 17/50 703/1 |
| 2012/0159304 A1 | 6/2012 | Listou | |
| 2013/0127596 A1 | 5/2013 | Jain et al. | |
| 2013/0173671 A1 | 7/2013 | Jager et al. | |
| 2013/0212087 A1* | 8/2013 | Chitiveli | G06F 17/30991 707/722 |
| 2013/0212576 A1* | 8/2013 | Huang | G06F 9/45558 718/1 |
| 2013/0228615 A1 | 9/2013 | Gates et al. | |
| 2013/0232420 A1 | 9/2013 | Manzari et al. | |
| 2013/0246934 A1 | 9/2013 | Wade et al. | |
| 2013/0254406 A1 | 9/2013 | Augenstein et al. | |
| 2013/0303085 A1 | 11/2013 | Boucher et al. | |
| 2014/0039421 A1 | 3/2014 | Morris | |
| 2014/0067801 A1* | 3/2014 | Marvit | G06F 17/30241 707/736 |
| 2014/0081967 A1 | 3/2014 | Morris | |
| 2014/0081968 A1* | 3/2014 | Morris | G06F 17/30997 707/736 |
| 2014/0089419 A1 | 3/2014 | Morris | |
| 2014/0089420 A1 | 3/2014 | Morris | |
| 2014/0112319 A1 | 4/2014 | Morris | |
| 2014/0280062 A1* | 9/2014 | Augustin | G06F 17/30991 707/722 |
| 2015/0350103 A1 | 12/2015 | Bertram et al. | |

OTHER PUBLICATIONS

Snyder et al. "RoboLeader for reconnaissance by a team of robotic vehicles." Collaborative Technologies and Systems (CTS), 2010 International Symposium on. IEEE, 2010.

Ross et al., "Interactive mathematics on the web: MathML for signals and systems demonstrations." Proceedings of the American Control Conference. vol. 1. 2003.

Gautam et al., "An Improved Framework for Tag-Based Academic Information Sharing and Recommendation System." Proceedings of the World Congress on Engineering. vol. 2. 2012.

Mirmohamadsadeghi et al., "Image tag propagation." Jun. 10, 2010)[Mar. 17, 2011]. http://mmspl, epfl. ch/webdav/site/mmspl/shared/Semesterproject_tagpropagation, pdf (2010).

Campbell "B72-4 System/360 Job Control Language." Computers, IEEE Transactions on 100.1 (1972): 108-109.

"ZoneTag: Photos and Talk of the ZoneTag Prototype"; flickr, Dec. 12, 2005, pp. 1-3, retrieved Jul. 14, 2014, <http://www.flickr.com/groups/zonetagusers/discuss/72157594213049684/>.

Naaman, Mor, "ZoneTag: Putting Your Photos in Context"; ZoneTag Demo at FoWA Summit, pp. 1-4, retrieved Jul. 14, 2014; <http://www.slideshare.net/mor/zonetag-demo-at-fowa-summit>.

Microsoft, "Styling and Templating", pp. 1-16, retrieved Jul. 14, 2014; <http://msdn.microsoft.com/en-us/library/ms745683%28v=vs.110%29.aspx>.

"Chef Documents: An Overview of Chef"; pp. 1-13, retrieved Jul. 14, 2014; <http://docs.opscode.com/chef_overview.html>.

Dietz et al., . "SurfaceWare: dynamic tagging for Microsoft Surface." Proceedings of the 3rd International Conference on Tangible and Embedded Interaction. ACM, 2009.

Abujauour et al., "Dynamic tags for dynamic data web services." Proceedings of the 5th International Workshop on Enhanced Web Services Technologies. ACM, 2010.

Sah et al., "Programming the Internet from the Server-Side with Tcl and Audience1," Proceedings of the USENIX Fourth Annual Tcl/Tk Workshop Monterey, California, Jul. 1996.

U.S. Appl. No. 14/451,569, entitled "Performing Actions on Objects as a Result of Applying Tags to the Objects", filed Aug. 5, 2014.

U.S. Appl. No. 14/451,840, entitled "Enabling a Tag to Show Status", filed Aug. 5, 2014.

U.S. Appl. No. entitled "Enabling a Tag to Show Status", filed Sep. 26, 2014.

"List of IBM Patents or Patent Applications Treated as Related".

* cited by examiner

| Name 101 | Type 102 | Category 103 | Tags 104 |
|---|---|---|---|
| Server 1 | POWER7 | compute | [Health_Certified] [Rochester] |
| Server 2 | POWER7 | compute | [Rochester] [DualVIOS] |
| Workflow 1 | Workflow | Workflow | [London] [DualVIOS] |
| Server 3 | x86 | compute | [Test] [DualVIOS] 105 — Press enter to apply tag 106 |

PERFORMING ACTIONS ON OBJECTS AS A RESULT OF APPLYING TAGS TO THE OBJECTS

CROSS-REFERENCE TO RELATED APPLICATION

This application is a continuation of co-pending U.S. patent application Ser. No. 14/451,569, filed Aug. 5, 2014. The aforementioned related patent application is herein incorporated by reference in its entirety.

BACKGROUND

The present invention relates to computer software, and more specifically, to computer software to perform actions on objects as a result of applying tags to the objects.

Tags have traditionally been used to organize files and other computing resources. Tags are typeless, in that a user may assign any type of meaning to any tag, without computer software understanding what the tag signifies. However, simply tagging an object does not cause the object to comply with the meaning of the tag.

SUMMARY

Embodiments disclosed herein include systems, methods, and computer program products to tag objects in a cloud computing environment, by tagging an object with a first tag, of a plurality of tags, wherein each of the plurality of tags specifies a respective criterion for objects tagged by each tag, and upon determining that the object not satisfy the criterion of the first tag, performing an action associated with the first tag to modify the object to meet the criterion of the first tag.

BRIEF DESCRIPTION OF THE SEVERAL VIEWS OF THE DRAWINGS

FIG. 1 depicts a graphical user interface to perform actions on objects as a result of applying tags to the objects, according to one embodiment.

DETAILED DESCRIPTION

Figure 2:
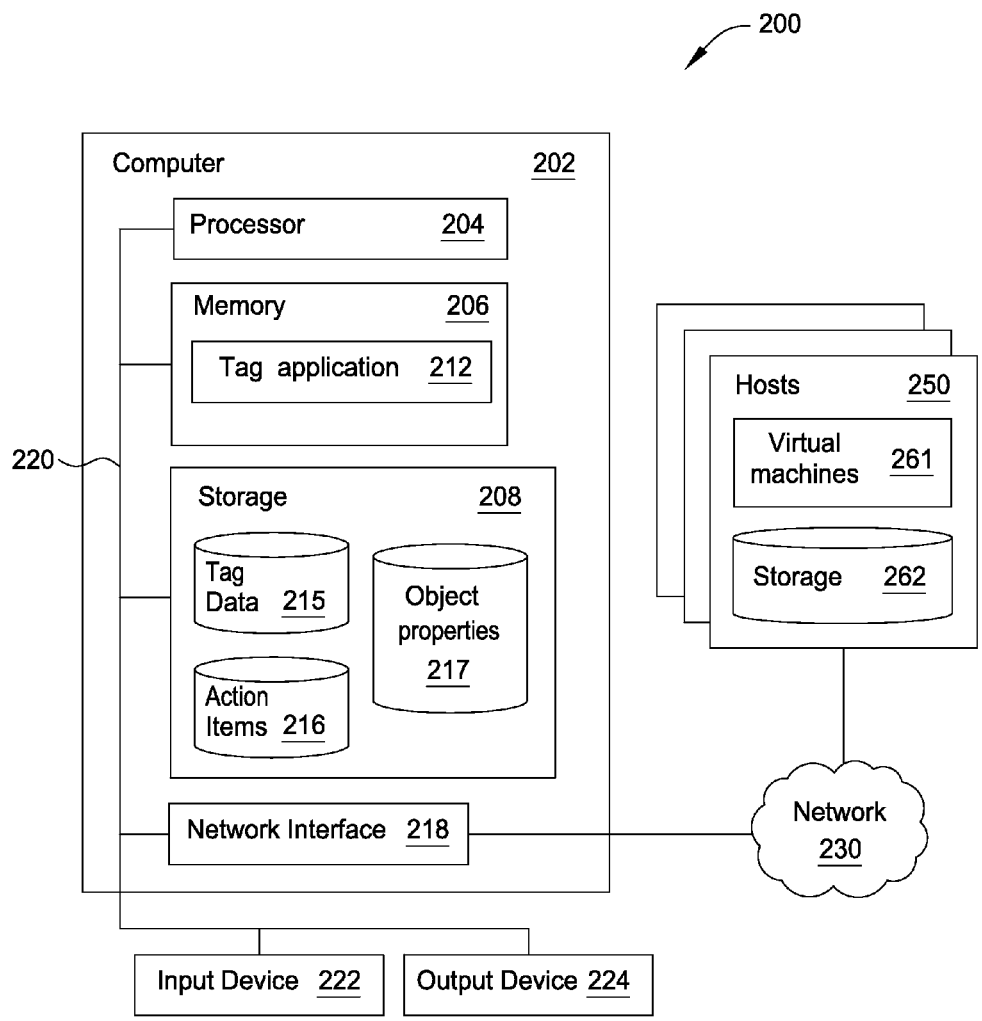
FIG. 2 depicts a system to perform actions on objects as a result of applying tags to the objects, according to one embodiment.

Embodiments disclosed herein associate textual tags with specific actions, such that when the tag is applied to computing objects, the actions are run in order to configure the object (or dependent objects) to comply with the tag. Tags may be applied directly to objects in a cloud computing environment, such as a computing resource or a workload to be deployed in the cloud computing environment. The computing resource may be hardware, software, or any combination thereof. The workload may be tagged with specific resource requirements, such that the resources targeted by the tagging are configured to be in compliance with the tag's criteria.

A tag, as used herein, refers to a textual metadata classifier that annotates (or classifies) an object with a set of criteria. Furthermore, a tag, as used herein, may provide an associated set of actions that cause tagged objects to comply with the criteria, if the tagged objects do not already comply with the criteria. If the tagged objects already comply with the criteria, the objects may be classified without acting on them. The tags may coexist with conventional tags in the same namespace. As used herein, an object may refer to, without limitation, any computing resource (software, hardware, or both), workflow, or workload.

For example, a user may define a "grayscale" tag that causes digital photographs and other digital images to be processed so that they have a grayscale color depth, if they don't have the grayscale color depth already. The user may associate the grayscale tag with a script that is configured to apply grayscale color depth to the digital images. When a user subsequently tags a digital photograph with the grayscale tag, the script may be invoked to convert the digital photograph from color to grayscale. As another example, a user may define an "EnergySaver" tag that may initiate actions and policies to adjust power capping, energy usage, and migrate virtual machines in order to shut down servers to save energy. When the user tags a virtual machine image with the EnergySaver tag, subsequent deployments of the virtual machine image will be deployed to a cloud computing configuration that complies with the predefined power saving techniques and requirements.

In any case, tagging objects as disclosed herein may be used to not only classify objects, but to configure objects so that they are altered to reflect the tag's meaning, and to specify requirements for workloads that have not yet deployed. Embodiments disclosed herein allow users, who tag existing resources with a specific purpose (as defined by the tag), to configure new resources for the same specific purpose without having to run complex actions and configurations each time. Furthermore, since tagging is used for classification and filtering, embodiments disclosed herein allow users to use the tag to understand which resources comply with the tag, as well as which resources are being configured to comply with the tag. The tag may specify any requirement, including, without limitation, as minimum resource allocations, operating parameters or environment, security parameters, virtual resource configurations, quality of service, class of service, and the like.

FIG. 1 depicts a graphical user interface (GUI) 100 to perform actions on objects as a result of applying tags to the objects, according to one embodiment. As shown, the GUI 100 lists different resources in a cloud computing environment. In this example, the resources are the objects to which tags are applied. Each resource includes a name 101, a type 102, a category 103, and a set of tags 104. The name 101 may be a name of a resource, such as the servers 1-3, and the workflow 1. The type 102 indicates a type of the resource, such as an x86 computer, Power7 server, or disk image. The category 103 indicates a category the resource belongs to, such as compute node or image. Although depicted to facilitate explanation of the disclosure, the type 102 and the category 103 are not required to enable tagging of an object. A tag may be applied to any label or identifier sufficient to uniquely identify an object. The tags 104 are a set of user-defined tags that have been applied to the object, in this example, servers and a workflow. The tags may be associated with a specified set of criteria and a set of actions that alter the resource to make the object comply with the set of criteria. Generally, a user may define any number and type of tags for any object. When a user wishes to apply a tag to an object, the user may apply any feasible method to apply the tag. As shown, for example and without limitation, a user is typing a tag 105, which is the DualVIOS tag. A popup notification 106 indicates that the user may apply the tag by pressing enter. The user may define the DualVIOS tag to be associated with two redundant virtual I/O servers. In defining the DualVIOS tag, a user may specify one or more criteria and associated actions. In one embodiment, the user may tag existing scripts used to deploy the dual virtual I/O servers, configuration patterns, or other templates that contain configuration information for the dual virtual I/O servers. Additionally, workflow images may be tagged, thereby specifying specific criteria that need to be present in order for the workload to be deployed in a data center.

Generally, when a user tags an object, embodiments disclosed herein may reference a data store of existing tags to determine if the tag has previously been defined. If the tag has not been defined, the user may specify the criteria and associated actions that cause different objects to comply with the tag. As such, users can apply previously defined tags, as well as create tags in a freestyle and ad hoc manner. If the tag has already been defined, the criteria and actions may be retrieved in order to ensure that the object complies with the tag.

When the user enters the tag 105, embodiments disclosed herein may analyze server 3 to determine whether the server is compliant with the tag. To determine if server 3 is compliant with the DualVIOS tag, the tag requirements may be compared against the current configuration of server 3. For example, a data store reflecting the status, capabilities, and configuration of server 3 may be referenced to identify whether it currently is executing (or is capable of executing) the dual virtual I/O servers. Additionally or alternatively, the resource (server 3) may be queried directly (or through a proxy, such as a management controller) to determine if server 3 is executing the dual virtual I/O servers. If server 3 is not currently executing dual redundant virtual I/O servers, embodiments disclosed herein may initiate a predefined set of actions to deploy the dual virtual I/O servers onto server 3. A user may optionally be prompted to approve the changes to server 3 prior to deploying the dual virtual I/O servers.

As another example, as shown, workflow 1 has also been tagged with the DualVIOS tag 104, as the workflow requires the two virtual I/O servers to run properly. When workflow 1 is subsequently deployed in a cloud computing environment, embodiments disclosed herein may enforce the DualVIOS tag 104 by ensuring the deployments include the dual virtual I/O servers. If, for example, active host servers having the dual virtual I/O servers configured, embodiments disclosed herein may deploy the workflow 1 to one or more of such active host servers. If active host servers are not found running dual virtual I/O servers (or that are capable of hosting dual virtual I/O servers), embodiments disclosed herein may scan other resources to find host servers in stand-by or other low priority pools that are compatible. This compatibility may be determined, as discussed above with reference to server 3, by referencing stored information of the stand-by servers, or retrieving the capabilities and current configuration of the stand-by servers directly (or by proxy). Once a compatible server is identified as a target, embodiments disclosed herein may tag the resource with the DualVIOS tag, which initiates the re-configuration of the server to include the dual virtual I/O servers. Once the configuration of the servers is complete, the workload may be deployed to the target server.

Generally, users may define any type of tag specifying any number and type of criteria, as well as any associated actions. As another example, a user may tag a compute node with a "PowerVC1" tag, which causes the node to be registered with a management application named "PowerVC1." Appending the tag DualVIOS to the compute node tagged PowerVC1 would cause the node to be added to the hardware management console (HMC3), installing two virtual I/O servers on the tagged node, and then adding the node into the PowerVC1 management application.

FIG. 2 depicts a system to perform actions on objects as a result of applying tags to the objects, according to one embodiment. The networked system 200 includes a computer 202. In at least one embodiment, the networked system 200 is a cloud computing environment. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains a tag application 212, which is an application generally configured to apply user-defined tags to computing objects, and cause user-defined actions to be applied to tagged objects. Generally, users may define any types of tags, which may be stored in the tag data 215. If the user creates a tag that has not been previously defined, the user may specify the tag criteria and any associated actions that may be performed in order to cause tagged objects to comply with the tag criteria. When a user applies a tag to an object, such as hardware, software, or a combination thereof, the tag application 212 may identify the tag criteria, and compare the criteria to the tagged object. The object properties may be stored in the object properties 217, or the object properties may be retrieved by querying a resource, or an application managing the resource. If the object complies with the criteria, the tag application 212, in some cases, may not take any further action. If the object does not comply with the tag criteria, the tag application 212 may perform one or more predefined actions to bring the object into compliance with the tag. The actions associated with the tag may be stored in the action items 216. For example, if a user tags a server as "webserver," the tag application 212 may identify the corresponding tag in the tag data 215, identify any action items 216 (user defined or otherwise) that cause a server to be configured as a web server, and execute the steps necessary to configure the server to host a web server. Additionally, the tag application 212 may group objects with common criteria together.

As shown, storage 208 contains the tag data 215, action items 216, and object properties 217. The tag data 215 contains a plurality of tags that may be applied directly to an object, such as a computing resource or a workload that targets computing resources. The tags in the tag data 215 may be associated with specific criteria and a set of actions that may alter a resource to comply with the tag criteria. The action items 216 is a repository of computer-executable code, scripts, or other configuration methods that may alter objects in order to make the resources comply with different tag criteria. In at least one embodiment, the action items 216 may themselves be tagged with tags from the tag data 215. Similarly, the tag data 215 may specify associated items in the action items 215. Doing so associates the tags in the tag data 215 with predefined actions in the action items 216, which allows the tag application 212 to ensure that objects are configured according to the tag criteria. The object properties 217 is a store configured to hold configuration information and other attributes of objects in the system 200. The object properties 217 may generally include configuration and attributes of computing resources or workflows. For example, hardware configurations, software configurations, and other information about one or more hosts 250, virtual machines, and other computing resources may be defined. In addition, the object properties 217 may also specify each tag that has been applied to each object.

The hosts 250 are compute nodes which perform different computing functions. For example, the hosts 250 may be configured to execute one or more virtual machines 261, or store data in storage locations 262. In one embodiment, the hosts 250 may be compute nodes in a cloud computing environment.

Figure 3:
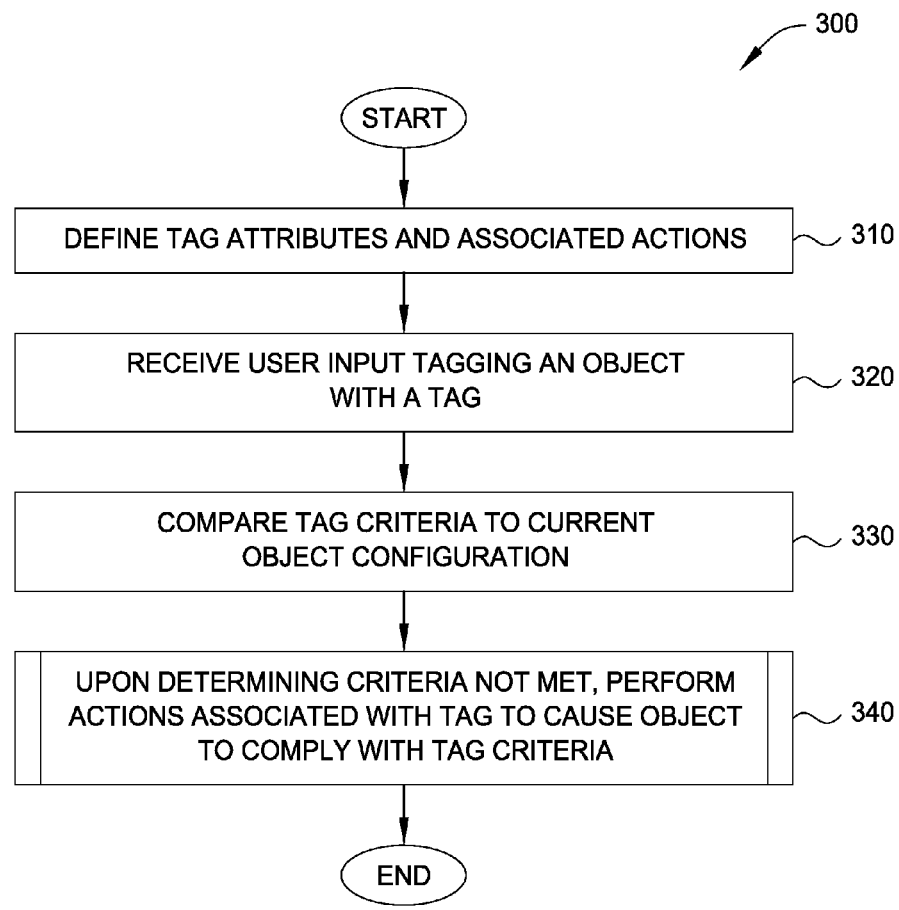
FIG. 3 depicts a method to perform actions on objects as a result of applying tags to the objects, according to one embodiment.

FIG. 3 depicts a method 300 to perform actions on objects as a result of applying tags to the objects, according to one embodiment. Generally, the steps of the method 300 run a set of predefined actions when a user applies a textual tag directly to a resource, or in reaction to a workflow or workload being deployed that is tagged with specific resource requirements, such that the resources targeted by the tagging are configured to be in compliance with the tag criteria. In at least one embodiment, the tag application 212 performs the steps of the method 300.

At step 310, a user may define tag attributes, criteria, and associated actions that are performed responsive to a user tagging an object with the tag. For example, a user may define a "SecurityCertified" tag, which may specify a set of security parameters for a hardware object, software object, or combination thereof. The tag attributes and criteria may be stored in the tag data 215. The user may further specify actions associated with the tag, such as applying security to communications transmitted by the object, configuring firewalls, and the like. The associated actions may be stored in the action items 316. At step 320, the tag application 212 may receive user input tagging an object with a tag. Generally, the user may tag any object in a computing environment with a tag, such as a computer, networking device, software image, files in storage locations, and the like. For example, the user may tag a compute node (i.e., a server) in a cloud computing environment with the SecurityCertified tag. The tag application 212 may also store the tag in a record for the tagged object in the object properties 217, reflecting that the tag has been applied to the object. At step 330, the tag application 212 compares the tag criteria, which may be stored in the tag data 215, to the object's current configuration. The tag application 212 compares the object properties to the criteria in order to determine whether the object complies with the tag criteria. For example, the tag application 212 may determine whether the server, tagged with the SecurityCertified tag, complies with the predefined attributes and criteria of the SecurityCertified tag. The tag application 212 may retrieve the server properties and configuration information from the object properties 217, the server itself, or a proxy, such as a management controller that manages the server.

At step 340, the tag application 212, upon determining that the tag criteria are not met, performs the actions associated with the tag in order to cause the object to comply with the tag. The associated actions may be, without limitation, a script, set of actions, or other configuration methods that may alter objects to make the object comply with the tag criteria. For example, the tag application 212 may cause firewalls to be configured, enable encryption on the server, and the like. Generally, the tag application 212 may cause any action to be taken to configure the tagged object, or resources that the tagged object targets.

As an example involving tagging a workload, the user may apply the SecurityCertified tag to a workload image. When the workload is subsequently deployed, the tag application 212 may ensure that the resources the workload is deployed to comply with the SecurityCertified tag. For example, the tag application 212 may identify resources that comply with the SecurityCertified tag attributes. If the tag application 212 does not find any matching (tagged) resources, the tag application 212 may automatically tag the existing resources to cause existing resources to be reconfigured to comply with the tags. Once SecurityCertified resources are configured, the SecurityCertified workload may be deployed to the resources for processing.

Figure 4:
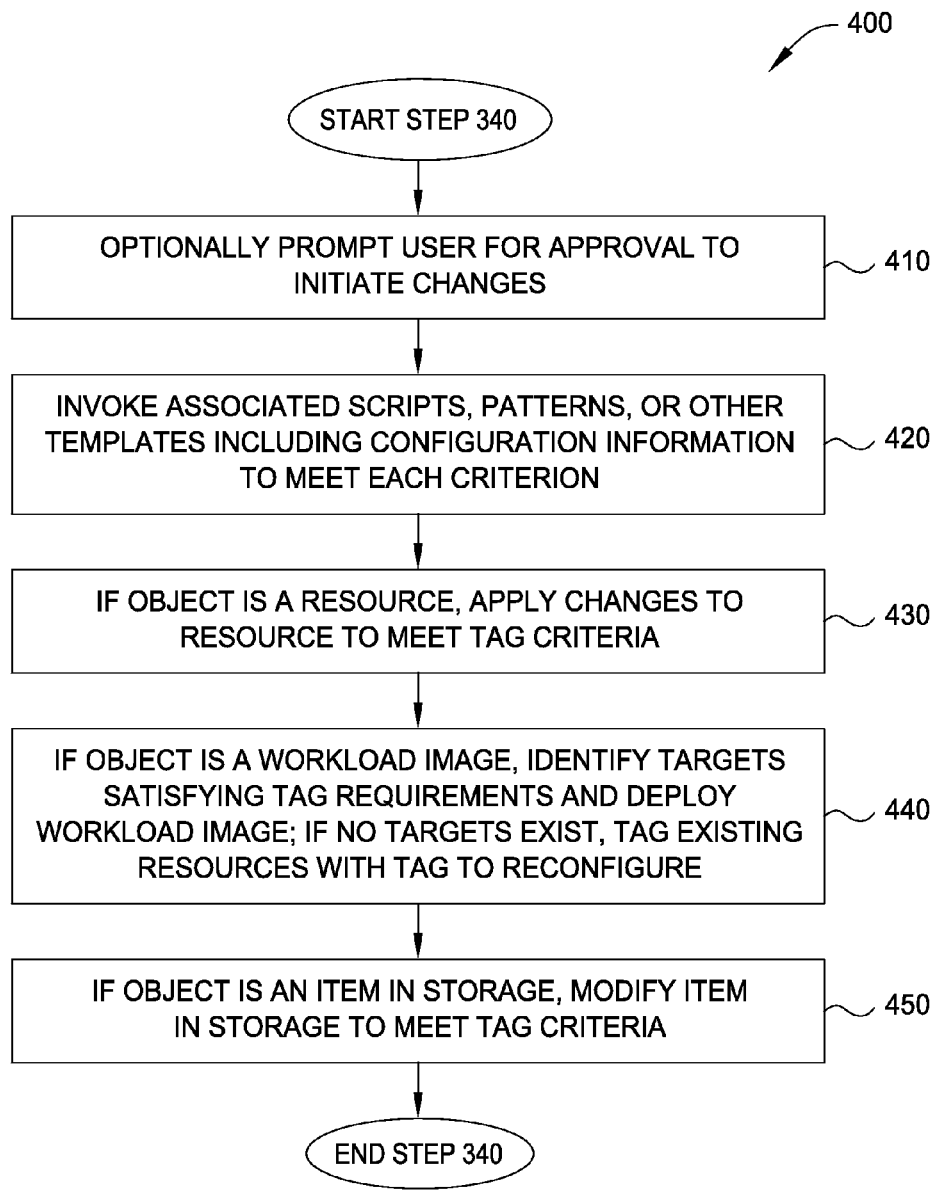
FIG. 4 depicts a method to perform actions associated with a tag, according to one embodiment.

FIG. 4 depicts a method 400 corresponding to step 340 to perform actions associated with a tag, according to one embodiment. Generally, the steps of the method 400 result in the reconfiguration of resources such that the resources comply with the tags applied to different objects. The tagged objects may be resources, data, or any combination of hardware or software. Additionally, the tagged objects may be workflows targeting different computing resources in a cloud computing environment.

At step 410, the tag application 212 may optionally prompt for user approval prior to triggering the actions to change the computing resources affected by the tags applied by the user. At step 420, the tag application 212 may generally invoke any associated scripts, patterns, or other templates that include configuration information designed to bring tagged objects into compliance with the tag criteria. For example, if a user tags a file as PasswordProtected, the tag application 212 may invoke a script which applies a password to the file. The script may apply a default password, or prompt a user to specify the password. If the object is a resource, the tag application 212, by the invoked actions at step 420, causes the resource to be configured to comply with the tag criteria at step 430. If the tagged object is a workload, at step 440, the tag application 212 may identify existing targets (such as compute nodes) satisfying tag requirements. If the tag application 212 finds no such existing resources, the tag application 212 may identify existing resources capable of meeting tag criteria. The tag application 212 may then tag these resources such that they are reconfigured to meet the tag criteria. At step 450, if the tagged object is an item in storage, the tag application 212 causes the item in storage to be modified to meet tag criteria. For example, if a user tags a digital photograph with a specified image format, the tag application 212 may invoke the necessary actions to convert the photograph to the specified image format. Generally, the tag application 212 may invoke any number of actions in order to cause the object to meet any number of criteria specified in the tag.

Figure 5:
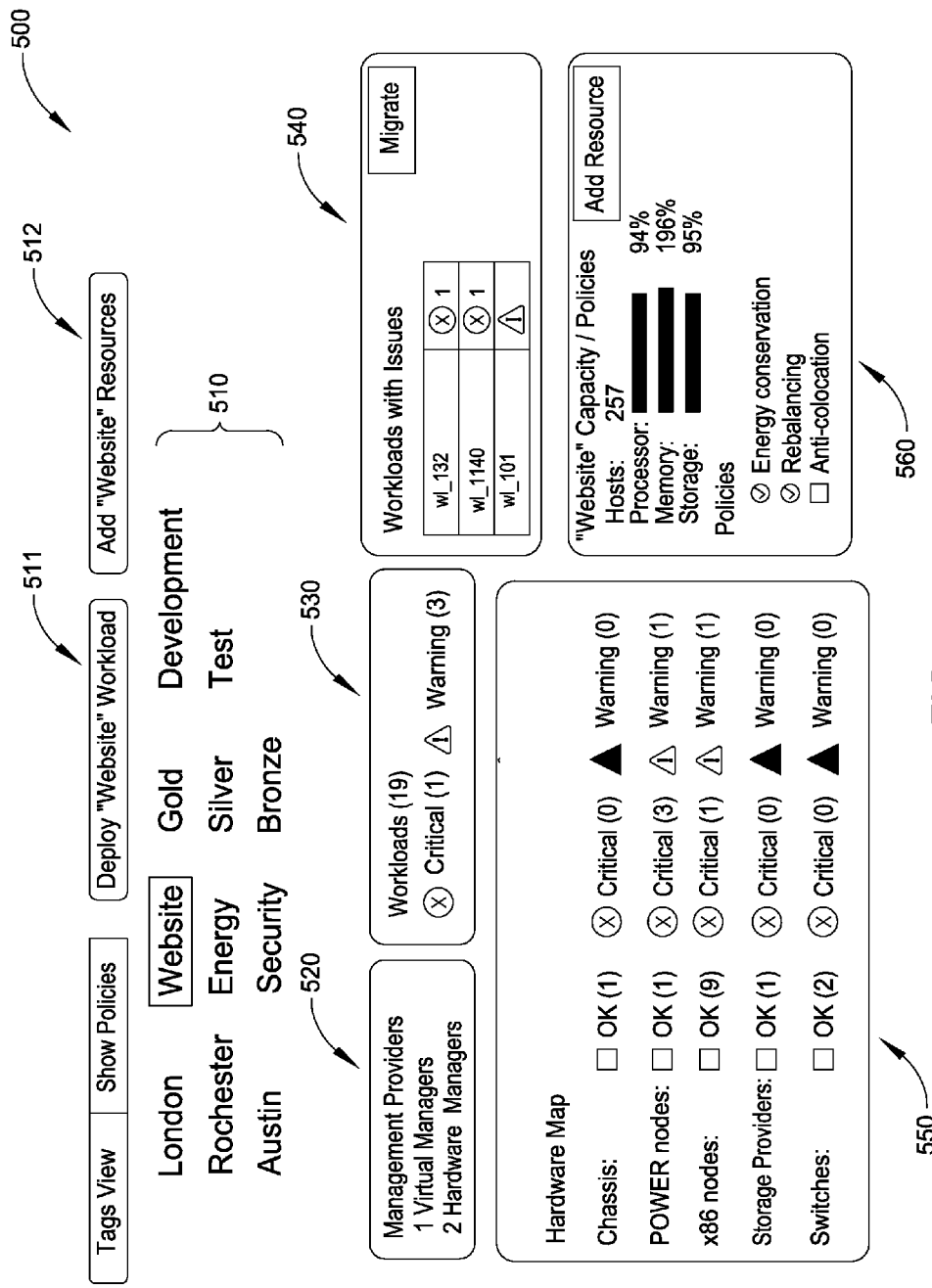
FIG. 5 depicts a graphical user interface to use tags in an infrastructure lifescycle, according to one embodiment.

FIG. 5 depicts a graphical user interface 500 to use tags in an infrastructure lifecycle, according to one embodiment. Generally, applying tags to objects in a computing environment allows the tags to be leveraged in order to manage the computing environment. In some computing environments, hundreds of thousands, if not millions of objects, need to be managed. As shown, the GUI 500 provides a set of tags 510 that a user can select in order to filter the resources down to only those resources having the specified tag. Therefore, when the user selects the Website tag 512, only those resources tagged with the Website tag may be displayed. In addition, a set of tools and actions scoped to the selected tag may be displayed. For example, and without limitation, elements 511 and 512 allow a user to deploy a Website workload and add website resources, respectively. When the user selects the elements 511 or 512, any added resources or workloads would be tagged with "Website," and any hardware configuration to make the newly added hardware compliant with the Website tag would be performed automatically. In addition, different management tools 520, 530, 540, 550, and 560 allow users to view management providers, workload statuses, workloads with issues, hardware maps, and capacity/policies related to the selected tag, respectively. Generally, the tools 520-560 are small views that summarize different categories of objects so that in one dashboard, many kinds of objects can be seen in summary. For example, if a user clicks "Website," the user instantly sees any object tagged with Website. In addition, in tool 520, the user would see how many hardware management consoles and how many virtual management consoles are involved in managing the web sites. In tool 530, the user would visualize how many workloads in the datacenter are contributing to the web sites. In tool 540, the user would see how many workloads contributing to web sites have problems. Using tool 550, the user would see what actual hardware components (computers, storage, network) are supporting the web sites. Finally, using tool 560, the user would receive an aggregate 'utilization' view highlighting how many resources and what kinds of policies are manipulating the web sites.

Advantageously, embodiments disclosed herein provide textual tags that are associated with predefined criteria and actions, such that when the tags are applied to objects in a computing environment, the actions are executed in order to configure the object (or dependent objects), such that the object complies with the tag. The tags may be applied to physical or virtual resources, software, data, and any other component in a computing environment. By defining a tag, users can configure items without substantial effort. Tagging, which is a universal way to classify objects, may therefore be extended to configure objects such that they are altered to reflect the tag's meaning. Furthermore, the tags may specify requirements for workloads that have not yet been deployed. When the workload is subsequently deployed, the workload may be deployed to underlying resources that comply with the tag criteria.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
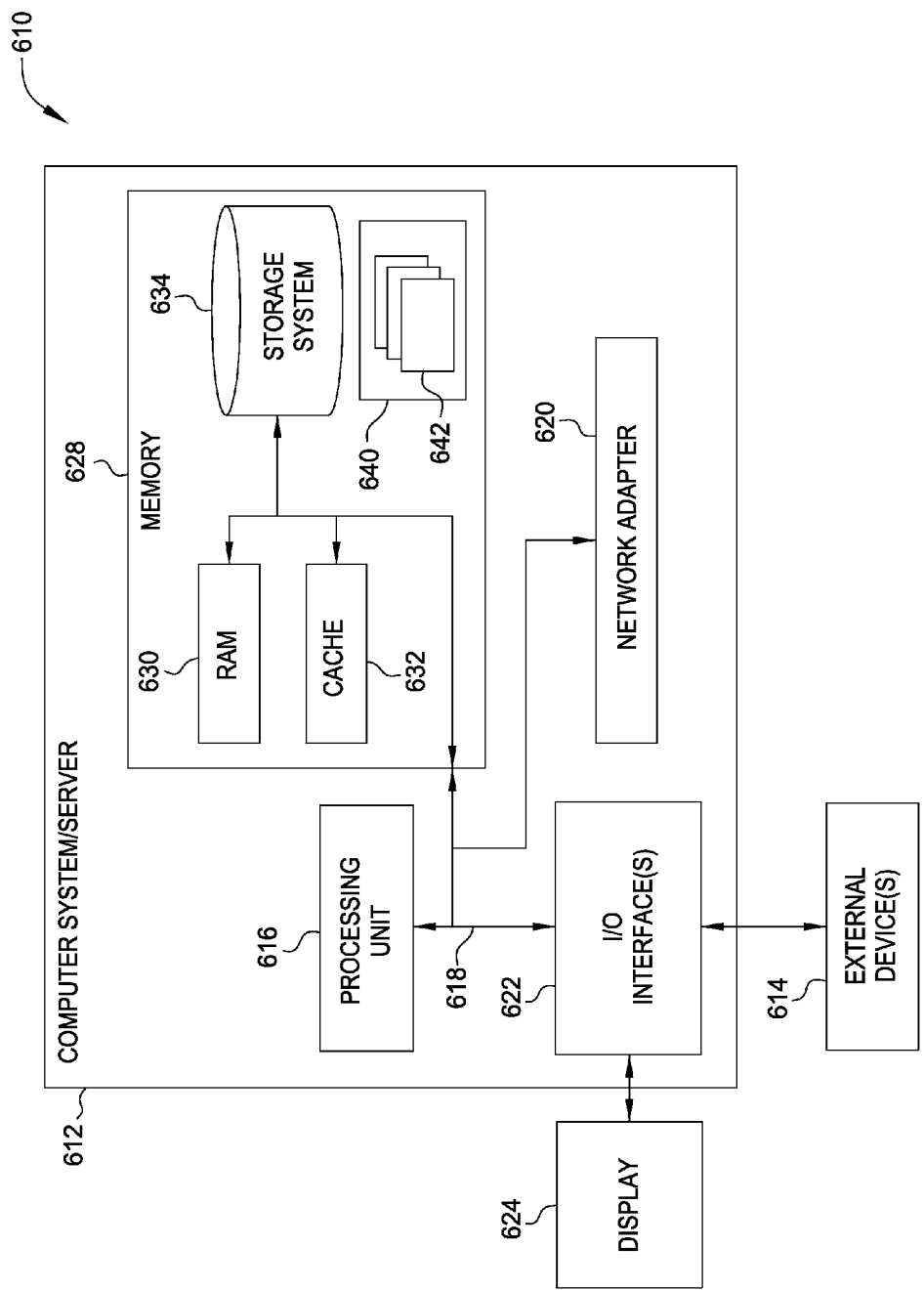
FIG. 6 depicts a cloud computing node according to an embodiment of the present invention.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
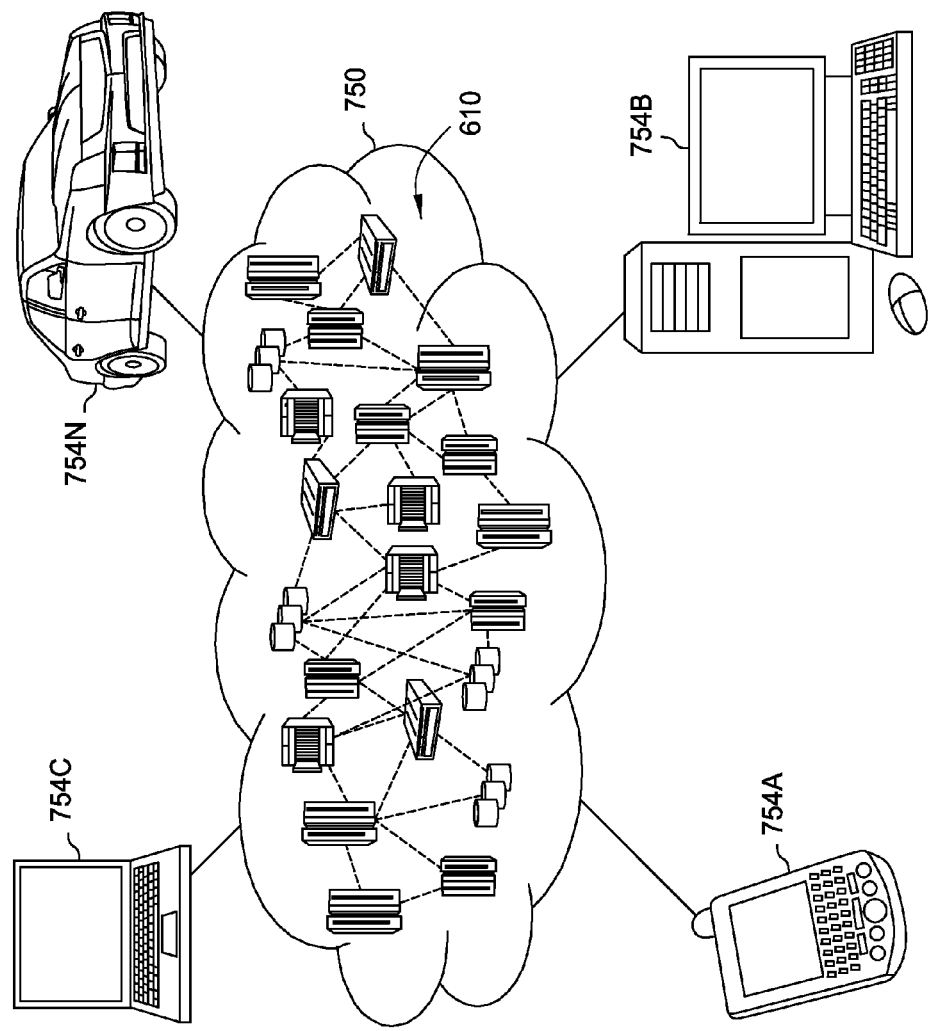
FIG. 7 depicts a cloud computing environment according to an embodiment of the present invention.

Referring now to FIG. 7, illustrative cloud computing environment 750 is depicted. As shown, cloud computing environment 750 comprises one or more cloud computing nodes 610 with which local computing devices used by cloud consumers, such as, for example, personal digital assistant (PDA) or cellular telephone 754A, desktop computer 754B, laptop computer 754C, and/or automobile computer system 754N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 610 and cloud computing environment 750 can communicate with any type of computerized device over any type of network and/or network addressable connection (e.g., using a web browser).

Figure 8:
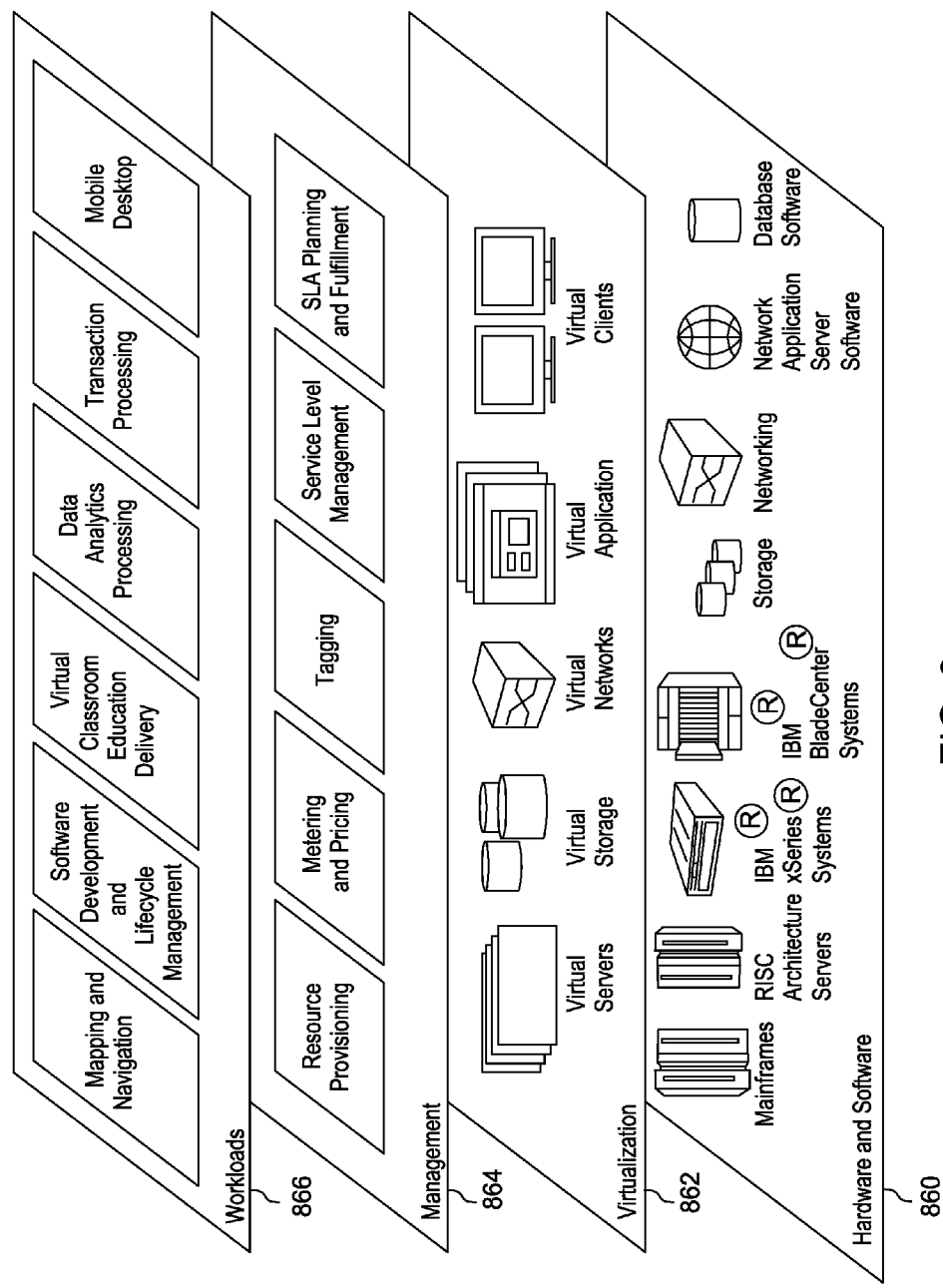
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Tagging allows users to tag objects in the cloud computing environment and cause the objects to conform to the applied tags, as described in greater detail above. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method to tag objects in a cloud computing environment, comprising:
    tagging, by operation of a computer processor, a first object and a second object with a first tag, of a plurality of tags, wherein each of the plurality of tags specifies a respective criterion that objects tagged by the first tag must comply with, wherein the first object comprises a compute node in the cloud computing environment, wherein the second object comprises a workload targeting the compute node, wherein the respective criterion comprises at least one of: (i) a physical resource allocation, (ii) a virtual resource configuration, (iii) a quality of service, (iv) a class of service, and (v) an operating condition in the cloud computing environment;
    comparing a respective attribute of the first and second objects to the respective criterion of the first tag;
    determining, based on a result of the comparison, that the first and second objects do not satisfy the respective criterion of the first tag;
    identifying a first set of action items and a second set of action items associated with the first tag, wherein the first and second sets of action items, when executed, alter the first object and the second object, respectively, to cause the first and second objects to comply with the respective criterion;

performing the first and second sets of actions associated with the first tag to modify the first and second objects, respectively, to meet the respective criterion of the first tag; and deploying the workload to execute on the compute node in the cloud computing environment in compliance with the respective criterion of the first tag and without configuring the first and second sets of action items.

2. The method of claim 1, wherein a first action item of the first set of action items comprises a first script associated with modifying the compute node to comply with the respective criterion of the first tag, wherein a second action item of the second set of action items comprises a second script associated with modifying the workload to comply with the respective criterion of the first tag.

3. The method of claim 2, wherein performing the first and second action items comprises executing the first and second scripts, wherein the attributes of the first and second objects comprise one or more of: (i) a service provided by the respective objects, (ii) a security attribute of the respective objects, and (iii) a configuration of the respective objects.

4. The method of claim 1, further comprising:
subsequent to performing the first and second sets of action items associated with the first tag, comparing the attributes of the objects to the respective criterion of the first tag;
determining, based on the comparison, that the objects comply with the respective criterion of the first tag; and
storing an indication that the objects comply with the respective criterion of the first tag.

5. The method of claim 1, further comprising: prior to executing the first and second sets of action items, receiving user input approving the modification of the objects.

6. The method of claim 1, further comprising:
displaying a set of the plurality of tags; and
responsive to receiving selection of the first tag, outputting for display a representation including all objects tagged with the first tag, including the first and second objects.

7. The method of claim 1, further comprising:
identifying a plurality of compute nodes for executing the workload in the cloud computing environment;
determining that an attribute of each of the plurality of compute nodes does not comply with the respective criterion of the first tag;
identifying a first compute node, of the plurality of compute nodes, wherein the first compute node is capable of meeting the respective criterion of the first tag;
tagging the first compute node with the first tag; and
performing the first set of actions associated with the first tag to cause the first compute node to comply with the respective criterion of the first tag, wherein the workload is deployed to the first compute node.

* * * * *